United States Patent Office 2,737,437
Patented Mar. 6, 1956

2,737,437

PREPARATION OF SHAPED CELLULOSE ARTICLES

Max Fredrick Bechtold, Kennett Square, Pa., assignor to E. I. du Pont de Nemours and Company, Wilmington, Del., a corporation of Delaware No Drawing. Application February 16, 1953, Serial No. 337,240

9 Claims. (Cl. 18—54)

This invention relates to shaped cellulose articles and, more particularly, the preparation of such articles.

The conversion of cellulose into tough, thin films and strong filaments by commercially useful methods has involved the preparation of solutions of the polymer, or of derivatives thereof, and the subsequent separate step of forming such solutions into the desired shapes. As carried out heretofore, such procedures have been limited by the fact that excessively high viscosity has prevented or made impractical the preparation and handling of solutions that are both high in polymer content and high in the molecular weight of the contained polymer.

Attempts to lower the viscosity of cellulose solutions and speed the dissolving of the cellulose through the use of heat have resulted in material polymer degradation. Nevertheless, for the lack of a better method, one of these procedures, the viscose process, has achieved great commercial success even though it involves chemical modification and degradation of the cellulose, as well as the dissipation of auxiliary chemicals. Consequently, it has been highly desirable to discover some practical method for forming films, filaments and the like that is not complicated by chemical modification, does not involve sacrifices in the properties of fabricated articles due to lowering substantially the degree of polymerization of the cellulose, nor does not involve the consumption of other chemicals and the disposal of waste products thereof.

Two methods of forming shaped objects of cellulose of good quality which do not possess the aforementioned disadvantages have been proposed.

One of these involves the formation of cellulose compositions, nonpourable at 25° C., comprising cellulose uniformly dispersed in a concentrated aqueous calcium thiocyanate solution, and then shaping the cellulose composition into a film, filament or the like at elevated temperature under pressure, as described in detail in U. S. patent application Serial No. 283,356, filed April 21, 1952, in the names of M. F. Bechtold and J. H. Werntz.

The second of these proposed methods involves forming an aqueous particulate dispersion of finely-divided cellulose containing a polymeric dispersing agent, forming this dispersion into a film, filament, or the like, contacting the formed cellulose dispersion with a salt solution which is a solvent for the cellulose, to coalesce the cellulose particles, removing the shaped article from the coalescing salt solution before the article loses its shape, and finally washing it free of salts, as described in detail in U. S. patent application Serial No. 322,161, filed November 22, 1952, in the names of R. C. Houtz and J. H. Werntz.

Both of these proposed methods are markedly superior to the older known methods used for preparing cellulose fibers and films. A certain disadvantage of the first of these proposed methods is that it involves the use of cellulose dispersions of relatively high viscosity and such dispersions are somewhat more difficult to handle in pumping through spinnerets in forming fibers. In the second of these proposed methods, the maintenance of the proper concentration of solvent in the coalescing bath is complicated by the fact the bath is being diluted with the water introduced with the cellulose dispersion and, further, the presence of the dispersing agent which accumulates in the coalescing bath, complicates recycling the coalescing solution.

An object of the present invention is to provide a new and practical process of preparing shaped cellulose articles. A further object is to provide such a process which avoids the aforementioned objections to the viscose process. A still further object is to provide such a process which also avoids the minor disadvantages of the two proposed methods of forming shaped articles of cellulose discussed above. Other objects will be apparent from the description of the invention given hereinafter.

The above objects are accomplished according to the present invention by dispersing cellulose of average particle size ranging from 0.1 to 300 microns in an aqueous solution of a solvent metal salt, the salt being present in the solution in an amount at least equal to the weight of the cellulose but the concentration of the solution being less than the minimum concentration at which the cellulose will dissolve, forming the resultant particulate cellulose dispersion into a shaped article at substantially atmospheric pressure, evaporating water from the shaped article at a temperature of at least 75° C. until the cellulose particles coalesce, and thereafter washing the shaped article free of the salt. Preferably, the shaped article after the cellulose particles have been coalesced, is immersed for a short period in a coagulating bath for the purpose of improving its wet strength before washing with water.

In a preferred and more specific embodiment, the invention comprises dispersing 5 to 35 parts, by weight, of cellulose of average particle size ranging from 0.1 to 100 microns in 95 to 65 parts of an aqueous solution of calcium thiocyanate, the calcium thiocyanate being present in the solution in an amount at least equal to the weight of the cellulose but the concentration of the solution being not more than 46.5%, forming the resultant particulate cellulose dispersion into a shaped article at substantially atmospheric pressure and temperature, evaporating water from the shaped article at a temperature of 90° to 130° C. and atmospheric pressure until the cellulose particles coalesce, and thereater, preferably after brief immersion in a coagulating bath, washing the shaped article with water until free of the salt.

The term "particulate dispersion" is used herein in the normal and accepted meaning of the term when referring to polymer dispersions. That is, particulate polymer dispersions are suspensions of polymer particles in a medium that is not a solvent for the polymer at the temperature involved. Thus, particulate dispersions of polymer particles are fundamentally different from molecular dispersions of polymer molecules, which latter dispersions are solutions.

A preferred manner of carrying out the process of this invention comprises the following steps.

Five to 35 parts of cellulose particles having all dimensions within the range of 0.1 to 100 microns are uniformly mixed with 95 to 65 parts of an aqueous solution of a solvent salt of a metal of groups I and II of the periodic table having an atomic number between 3 and 38, inclusive, and an inorganic acid, the total amount of the salt in the solution being at least equal to the weight of the cellulose and the concentration of the salt in the solution being not more than 95% of the minimum concentration of the particular salt being used that will substantially completely dissolve the cellulose at some elevated temperature. The mixing of the cellulose and the salt solution can be accomplished by conventional means, e. g., simply by shaking the two together, by using a mechanical mixer, by milling in a slow speed mixer of the Banbury type, or in a screw extruder. The mixing can be done at room temperature (about 20° C.–30° C.), at moderately elevated temperatures, e. g., 30° C. to 50° C., or down to the freezing point of the salt solution.

The resultant particulate cellulose dispersion is formed into the desired shape, e. g., a film or filament, by extruding the dispersion through a die or spinneret of desired shape and size by mechanical means, or by the pressure of an inert gas, onto a suitable support, e. g., a moving belt or wheel in case films are being prepared, or onto a grooved, moving belt or wheel in case filaments are being prepared. Alternatively, the dispersion can be extruded into a hot atmosphere without any support for the article.

The shaped article, which at this stage is still an opaque, particulate cellulose dispersion, is then subjected to a temperature of at least 75° C. at atmospheric pressure, preferably, at a temperature between 90° C. and 130° C., to evaporate part of the water from the dispersion. An air blast or steam jet is sometimes useful in expediting the removal of water from the shaped dispersion. The removal of the water from the dispersion results in an increase in the concentration of the metal salt in the remaining solution. Sufficient water is evaporated to make the remaining solution a solvent for the cellulose at a temperature of 75° C. or higher. As the solvent power of the salt solution increases, the dispersed cellulose particles are coalesced and a transparent, or at least translucent, continuous, rubbery gel film or filament is formed.

The resulting gel article can be washed free of salts with water at this stage but, during the washing step, it is quite weak and opaque. However, if the film, filament, or the like is immersed in a coagulating bath before being washed, the strength and clarity of the gel article is greatly improved. Accordingly, it is preferred to immerse the gel article in a coagulating bath such as, for example, 25% aqueous sodium chloride or acetone, for a short time, the optimum time depending on the thickness and shape of the article, before washing. Times ranging from one minute or even less to an hour or more are satisfactory in this coagulating step, the exact time being determined by separate experiment for each filament diameter or film thickness.

After the gel fibers or films have been immersed in the coagulating bath for a length of time such that they do not weaken appreciably when transferred to water, they are next washed in water until they are substantially free of salts. Usually, three to four changes of water are sufficient to obtain washings no longer giving a positive test for dissolved salts. The washed films or fibers are then dried at ordinary or moderately elevated temperatures, e. g., at temperatures of preferably 25° C. to 50° C. and at 40% to 90% relatively humidity when unsoftened. It is convenient in some cases to remove excess liquid from gel films by pressing the film on a polished plate with a squeegee. The shrinkage of the gel fibers or films on drying can be controlled by drying them under tension. The gel fibers or films can be drawn, or stretched, at ordinary temperatures and then dried under tension to give higher tenacity products.

The following examples wherein all proportions are by weight and all processing steps are conducted at room temperature (about 20° C.–30° C.) unless otherwise stated, illustrate specific embodiments of the invention.

EXAMPLE I

Unsoftened viscose cellophane having a degree of polymerization of 200 is pulverized by passing through a hammer mill and then through a 50-mesh standard screen (having openings of 297 microns). A dispersion is prepared from this powdered cellophane by thoroughly mixing 12.5 parts of the cellophane, which contains about 1.5 parts of water, with 87.5 parts of a 40%, by weight, aqueous solution of calcium thiocyanate. The resulting low viscosity slurry is flowed onto a glass plate in a layer about 5 mils thick and the dispersion dried in a forced draft oven at 120° C. During this drying the cellulose particles coalesce to a coherent film, which, after cooling, is immersed for six minutes in a 25% aqueous sodium chloride solution coagulating bath and then washed free of salts with water. The resulting gel film is pressed on a chromium plate, excess water removed with a squeegee and then air-dried at 50% relative humidity. The dry film has fair strength and is hazy.

EXAMPLE II

Another dispersion of the pulverized cellophane described in Example I is prepared by mixing together uniformly 83 parts of a 40% aqueous solution of calcium thiocyanate and 60 parts of a 10% solution of polyvinyl alcohol in water with 17 parts of the 50-mesh cellophane. The polyvinyl alcohol amounts to about 40% of the weight of the cellulose in the dispersion, and produces a smoother dispersion which can be more readily spread on a glass plate by means of a spreader knife than a similar dispersion without the polyvinyl alcohol. The dispersion is knifed onto a glass plate in a layer about 5 mils thick. The supported dispersion is heated for two minutes on a steam bath (at 90° C.–100° C.) whereupon the cellulose particles coalesce. The resulting gel film is immersed for three minutes in a 25% aqueous sodium chloride solution coagulating bath and then stripped from the glass support and washed free of salts in water. The air-dried film is hazy. The dry film has about the same clarity and strength as one prepared from a dispersion of the same composition except for the omission of the polyvinyl alcohol.

EXAMPLE III

A dispersion of the pulverized cellophane described in Example I is prepared by mixing 9.6 parts of the powdered cellulose uniformly with 90.4 parts of a 46.5% aqueous calcium thiocyanate solution. The resulting dispersion is knifed onto a glass plate in a layer about 5 mils thick and heated on a steam bath for eight minutes to coalesce the cellulose particles. The gel film is immersed for ten minutes in a 25% aqueous sodium chloride solution coagulating bath and then washed free of salts with water. The air-dried film is tough, translucent, and has good strength.

EXAMPLE IV

Eleven parts of the powdered cellulose described in Example I is thoroughly mixed with 89 parts of a 50% aqueous solution of calcium bromide. This dispersion is spread on a glass plate in a layer about 5 mils thick and then heated three minutes on a steam bath. At the end of this treatment the cellulose particles are coalesced into a gel film. This gel film is immersed for ten minutes in a 25% aqueous sodium chloride solution. The resulting clear, rubbery gel film is washed free of salts with water and air-dried. The resulting film is tough and hazy.

EXAMPLE V

Ten parts of finely-divided, chemically purified wood cellulose fibers of an approximate average particle size of 35 microns (97% passing through a 100-mesh standard screen and 78% passing through a 200-mesh standard screen) and containing about 7% moisture, are mixed uniformly with 90 parts of a 30% aqueous calcium thiocyanate solution. This dispersion is flowed onto a glass plate in a layer about 5 mils thick and the cellulose particles are coalesced by heating the film for six minutes on a steam bath. The resulting gel film is immersed in a 25% aqueous sodium chloride solution for six minutes and then washed free of salts with water. After air-drying, the film is tough and translucent.

EXAMPLE VI

A finely-divided, partially acetylated cellulose containing 5% acetyl radicals is prepared from wood pulp (having a degree of polymerization of 1400 and containing 96% alpha-cellulose) of the type used commercially for the manufacture of cellulose acetate, as follows: To 63 parts of glacial acetic acid and 2 parts of acetic anhydride are added 16.6 parts of the wood pulp and the mixture is stirred continually. After eight minutes, 20 parts of glacial acetic acid are stirred in and, after 38 minutes, a solution of 0.25 part of concentrated sulfuric acid in 12 parts of glacial acetic acid are added. Stirring is continued for an additional 30 minutes, when 6 parts of acetic anhydride are added and stirring continued for an additional 45 minutes. The reaction mixture is washed free of acid with water, centrifuged and then dried. The dried product, containing 5% acetyl and having a degree of polymerization of 417, is mixed with solid carbon dioxide and the mixture passed through a micro-pulverizer and a "Micronizer." The ground product is screened and the portion which passes through a 200-mesh standard screen (having openings of 74 microns) is isolated and used in the preparation of dispersions.

One part of the low-substituted cellulose acetate described above is mixed uniformly with 9 parts of a 20% aqueous solution of calcium thiocyanate. The resulting dispersion is spread in a thin layer, about 5 mils thick, on a glass plate as in the preceding examples and the supported layer heated on a steam bath for four minutes to coalesce the cellulose particles. The resulting gel film is immersed for three minutes in a 25% aqueous sodium chloride solution, then washed free of salts and air-dried. The resulting film is hazy and has fair strength.

EXAMPLE VII

A dispersion of 1 part of the low-substituted cellulose acetate described in Example VI in 9 parts of a 50% aqueous lithium bromide solution is prepared as in the preceding examples. This dispersion is spread on a glass plate and the supported film, about 5 mils thick, is heated on a steam bath for eleven minutes. The gel film in which the cellulose particles are coalesced, is then immersed in 25% aqueous sodium chloride solution for five minutes, washed free of salts in water and air-dried. The resulting film is hazy and has fair strength.

EXAMPLE VIII

A dispersion of 1 part of the partially acetylated cellulose of Example VI in 9 parts of a 54% aqueous lithium bromide solution is prepared as in the preceding examples. This dispersion is spread on a glass plate in a layer 5 mils thick and heated for 35 minutes on a steam bath to coalesce the cellulose particles. The resulting gel film is immersed for ten minutes in a 25% aqueous sodium chloride solution, washed free of salts with water and air-dried. The resulting film is hazy.

EXAMPLE IX

Ten parts of the powdered partially acetylated cellulose described in Example VI is uniformly dispersed in 90 parts of a 40% aqueous calcium thiocyanate solution. The resulting smooth dispersion is extruded through a spinneret having a single opening about 0.01 inch in diameter onto a moving glass plate heated by means of low pressure steam (temperature about 90° C.–100° C.) for a period of about one minute. At the end of this time the filament is a translucent gel in which the cellulose particles are coalesced. The monofil is then immersed in a 25% aqueous sodium chloride solution for about five minutes, washed free of salts with water and then wrapped around a cylinder and air-dried at room temperature. The resulting filament is tough and easily handled.

EXAMPLE X

A dispersion of 1 part of glassine paper pulp having a surface area of 29.2 m.$^2$/g. (which is substantially equivalent to the surface area of uniform small particles of 0.13 micron diameter) in 12 parts of a 36.1% aqueous lithium bromide solution is extruded through a hypodermic needle into a fiber which is supported on a glass plate. This fiber is heated at 80° C. until coalescence of the particles occurs, this being indicated by substantial clarification of the fiber. The gel fiber is then removed from the plate, washed with water, and dried. A film is prepared from this same dispersion by spreading the dispersion on a glass plate with a spreader knife, then coalescing and washing the film in the same manner as the fiber. The resultant gel film has a tensile strength of 1333 lb./sq. in.

It will be understood the above examples are merely illustrative and the invention broadly comprises the preparation of shaped cellulose articles by dispersing cellulose of average particle size ranging from 0.1 to 300 microns in an aqueous solution of a solvent metal salt such as calcium thiocyanate or the like, the salt being present in the solution in an amount at least equal to the weight of the cellulose but the concentration of the solution being less than the minimum concentration at which the cellulose will dissolve, forming the resultant particulate cellulose dispersion into a shaped article at substantially atmospheric pressure, evaporating water from the shaped article at a temperature of at least 75° C. until the cellulose particles coalesce, and thereafter washing the shaped article free of the salt.

The process of this invention is not limited to the particular types of cellulose shown in the examples but is applicable in general with any type of cellulose having the specified particle size. The use of chemically treated cellulose is advantageous in this invention. Such cellulose includes cellulose regenerated from viscose, acid-treated wood pulps and cotton linters, and water-insoluble, low-substituted derivatives of cellulose with monofunctional reactants and having at least 2.5 free hydroxyl groups per glucose unit, e. g., low-substituted methylcellulose, ethylcellulose, cyanoethylcellulose, cellulose acetate, and the like, of the specified particle size.

Commercial chemically purified cotton linters and wood pulps used in the manufacture of cellulose acetate and of viscose are especially useful in the process of this invention when their particle size is reduced to between 0.1 and 100 microns average diameter. Another type of cellulose which is particularly useful in the process of this invention is cotton linters or wood pulp which has been activated by contact with a dilute solution of a strong acid, preferably a mineral acid such as dilute aqueous nitric acid or dilute aqueous hydrochloric acid. Still another useful form of activated cellulose is that obtained by contacting cotton linters or wood pulp with a solution of sulfuric acid in glacial acetic acid, the quantity of sulfuric acid in the solution amounting to approximately 1.5% by weight of the cellulose, and then reacting the cellulose with an alcoholic solution of an alkali such as potassium hydroxide, to remove any acetate groups which may have been formed by the acetic acid treatment.

Cellulose of the desired particle size, i. e., less than 300 microns average diameter and, preferably, 0.1 to 100 microns average diameter, can be obtained by grinding cotton linters, wood pulp, regenerated cellulose fibers or films and water-insoluble cellulose derivatives cold in a ball mill, a micropulverizer, or an attrition mill of the type known as "Micronizer."

While the degree of polymerization (DP) of the cellulose is not a critical factor in the process of this invention, it is preferred to use cellulose or cellulose derivatives having a DP of at least 150. Shaped articles made from cellulose of DP less than 150 are generally poor in strength.

The degree of polymerization referred to in this specification is based on the following method of calculation. The absolute viscosity of a solution of cellulose in cupriethylenediamine is determined by Tappi suggested method T-230 sm-46 (Paper Trade Journal 124, 37-41 (1947)), the solution being prepared as described for the falling ball method, but the viscosity actually being determined in a Cannon-Fenske viscometer. From the observed absolute viscosity is calculated the intrinsic viscosity $[\eta]$, and the degree of polymerization, DP, is calculated from $[\eta]$ by the formula:

$$DP = [\eta]^{1.105} \times 118.4$$

The solvent metal salts used in the present invention are water-soluble metal salts and they can be any such salts, aqueous solutions of which are known to dissolve cellulose at elevated temperatures. Concentrated aqueous solutions of neutral salts that form hydrates and have boiling points within a certain range, that have viscosities above a certain minimum, and have positive heats of dilution within certain limits, as defined by Williams in Manchester Memoirs, vol. LXV, No. 12, 1-14 (1921), are especially suitable and are preferred for use in this invention. If desired, the salt solutions can be composed of a mixture of such neutral salts or a mixture of a solvent salt with a nonsolvent salt in such proportions that the mixed solution meets the above-mentioned limiting properties.

Specific examples of solvent metal salts that are suitable for use in the process of this invention, include calcium thiocyanate, lithium thiocyanate, sodium thiocyanate, zinc thiocyanate, potassium thiocyanate, magnesium thiocyanate, manganese thiocyanate, calcium iodide, calcium bromide, calcium nitrate, zinc iodide, zinc bromide, and zinc chloride. The salts operable for use in the process of this invention are, in general, found among the water-soluble thiocyanates, nitrates, iodides, bromides, and chlorides of metals of groups I and II of the periodic table having atomic numbers from 3 to 38, inclusive, or compatible mixtures of these salts. Typical mixtures of salts which are operable include calcium thiocyanate with calcium bromide and with calcium chloride.

The concentrations of the metal salt solutions used in preparing the cellulose dispersions for use in the process of this invention can vary over a wide range. However, it is essential that the concentration of the salt solution be below the minimum concentration of that particular salt which is capable of dissolving substantially completely the particular cellulose employed at the optimum temperature for dissolving the cellulose. Preferably, the concentration of the salt in the solution is less than 95% of this minimum solvent concentration. There is no lower limit to the concentration of the salt solution that can be used other than that the total amount of salt in the solution is at least equal to the weight of cellulose in the dispersion. However, the concentration of metal salt should preferably be at least 20% since the more concentrated solutions give the best results, and it is uneconomical to evaporate substantially more water than necessary.

The minimum solvent concentration of any salt is readily determined by placing a small amount of finely-divided cellulose, e. g., 0.25% of the weight of the salt solution, in any given concentration of the salt being tested and stirring the mixture at 120° C. The behaviour of the cellulose is observed. If the cellulose is completely dissolved within 30 minutes, similar tests are made with salt solutions of progressively lower concentrations until the lowest concentration is found which will substantially completely dissolve the cellulose. If the original test solution does not dissolve the cellulose, gradually increasing concentrations are tried until the minimum solvent concentration is found. The variation in the minimum solvent concentrations of different metal salts is illustrated by the data in the following table.

*Minimum solvent concentration of typical metal salts for commercial purified hemlock wood pulp*

SOLUBILITY OF CELLULOSE IN AQUEOUS SOLUTIONS OF INDICATED CONCENTRATION

| Salt | Completely Soluble | Substantially Completely Soluble [1] | Largely Insoluble |
| --- | --- | --- | --- |
| | Percent | Percent | Percent |
| $Ca(SCN)_2$ | 56.6; 51 | 49 | 46.5 (swollen). |
| $CaBr_2$ | 75; 61.3 | 55 | 50 (not swollen). |
| $Ca(NO_3)_2$ | | 69.5 | 67; 64.5 (swollen). |
| $LiBr$ | 68 | 59 | 54.6 (swollen). |

[1] Minimum solvent concentration.

From this table it is evident that the minimum solvent concentration varies considerably with the particular salt being used, there being a variation of 20.5% in the four specific salt solutions in this table. Similarly, the limiting solvent concentration will vary somewhat with the particular type of cellulose being employed. In general, the minimum solvent concentration will be lower for the partially substituted celluloses or for regenerated cellulose than for native unsubstituted celluloses.

After the shaped article is coalesced by evaporation of solvent at temperatures above 75° C., it can be immediately washed free of salts with water, but during the washing step the films or filaments are quite weak and opaque. However, if the film, filament, or the like is immersed in a coagulating bath before being washed, the strength and clarity of the gel article is greatly improved. Accordingly, it is preferred to immerse the gel article in a coagulating bath for a short time, the optimum time depending on the thickness of the fiber, film, or like before washing out the neutral salt with water. Times ranging from one minute or even less to an hour or more are satisfactory.

Various types of coagulating baths can be used to improve the properties of the gel structures. Examples of suitable coagulating baths include aqueous salt solutions such as, for example, 25% sodium chloride, 25% calcium chloride, 35% magnesium chloride, 50% sodium formate, 30% sodium acetate, 25% ammonium chloride, 50% ammonium nitrate, and other baths such as 50% aqueous glycerol, 50% acetic acid, absolute alcohol, 2B denatured alcohol, glycerol, methanol and acetone. A preferred coagulating bath is 25% aqueous sodium chloride since it forms films of greater clarity and strength than many of the others. When calcium thiocyanate is employed as the solvent metal salt, sodium chloride is especially preferred as a coagulating bath since calcium thiocyanate can be recovered easily from solutions containing these two salts. Acetone is another preferred coagulating bath since it also gives fibers and filaments of greater clarity and strength than many of the others.

An optional step in the process of this invention, which is beneficial in certain cases, is to draw or stretch the gel film or filament after removal from the coagulating bath and prior to washing to improve its physical properties. When gel fibers or films are drawn at ordinary temperatures and then dried under tension, higher tenacity products are obtained.

The cellulose dispersions used in the process of this invention can be modified, if desired, by incorporating therein during their preparation such modifiers as plasticizers, pigments, inert fillers, polymers, copolymers, and the like. Dilution of the cellulose dispersions can be made with minor amounts of other salts, acids, or bases in amounts that do not seriously impair their formability and do not seriously reduce the strength of the formed articles. It is also possible to impregnate the cellulose gel films or filaments with softeners, plasticizers, polymers, or dyes by immersing the gel film or filament in an aqueous solution of the desired softener or other modifier prior to the final drying step.

The present invention avoids the serious difficulties which are inherent with the older published methods of preparing shaped articles from cellulose compositions of various types. Thus, high molecular weight cellulose can be used and there is no substantial degradation of it during the process of this invention because the cellulose is exposed to hot salt solutions for only short times. The process of this invention also avoids certain disadvantages mentioned supra in connection with the process of the aforementioned applications of Bechtold and Werntz, Serial No. 283,356 and Houtz and Werntz, Serial No. 322,161. For example, the present process obviously does not have to use cellulose dispersions of the relatively high viscosity required in the process of Serial No. 283,356 nor does it require the use of a polymeric dispersing agent or the maintenance of a solvent salt coalescing bath at a definite minimum concentration as required in the process of Serial No. 322,161.

In addition to their use in the formation of shaped articles such as films and filaments, cellulose dispersions in metal salt solutions can be converted by the process of this invention to sponges or to coatings on various substrates as a finish or they can be coated on fabrics.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing shaped cellulose articles which comprises dispersing cellulose of average particle size ranging from 0.1 to 300 microns in an aqueous solution of a solvent metal salt, said salt being present in said solution in an amount at least equal to the weight of said cellulose but the concentration of said solution being less than the minimum concentration at which said cellulose will dissolve, forming the resulting particulate cellulose dispersion into a shaped article at substantially atmospheric pressure, evaporating water from said shaped article at a temperature of at least 75° C. until said cellulose particles coalesce, and thereafter washing said shaped article free of said salt.

2. Process as set forth in claim 1 wherein said solvent metal salt is a salt of a metal from the group consisting of the metals of groups I and II of the periodic table having an atomic number between 3 and 38, inclusive, and an inorganic acid.

3. Process as set forth in claim 1 wherein said solvent metal salt is calcium thiocyanate.

4. Process as set forth in claim 1 wherein said shaped article is immersed in a coagulating bath after said cellulose particles are coalesced and prior to washing said shaped article.

5. Process as set forth in claim 3 wherein said shaped article is immersed in an approximately 25% aqueous sodium chloride coagulating bath after said cellulose particles are coalesced and prior to washing said shaped article.

6. Process as set forth in claim 5 wherein said cellulose is of average particle size ranging from 0.1 to 100 microns.

7. Process of preparing shaped cellulose articles which comprises dispersing 5 to 35 parts, by weight, of cellulose of average particle size ranging from 0.1 to 100 microns in 95 to 65 parts of an aqueous solution of calcium thiocyanate, said calcium thiocyanate being present in said solution in an amount at least equal to the weight of said cellulose but the concentration of said solution being not more than 95% of the minimum concentration at which said cellulose will dissolve, forming the resultant particulate cellulose dispersion into a shaped article at substantially atmospheric pressure and temperature, evaporating water from said shaped article at a temperature of 90° C. to 130° C. and atmospheric pressure until said cellulose particles coalesce, and thereafter washing said shaped article with water until free of said salt.

8. Process as set forth in claim 7 wherein said shaped article is immersed in a coagulating bath after said cellulose particles are coalesced and prior to washing said shaped article.

9. Process as set forth in claim 8 wherein said coagulating bath is an approximately 25% aqueous sodium chloride coagulating bath.

References Cited in the file of this patent

UNITED STATES PATENTS

| | | |
|---|---|---|
| 113,454 | Schmidt | Apr. 4, 1871 |
| 543,986 | Edison | Apr. 6, 1895 |
| 2,140,921 | Rein | Dec. 20, 1938 |